C. N. CROUCH.
CAR WHEEL.
APPLICATION FILED JULY 20, 1910.
981,536.
Patented Jan. 10, 1911.
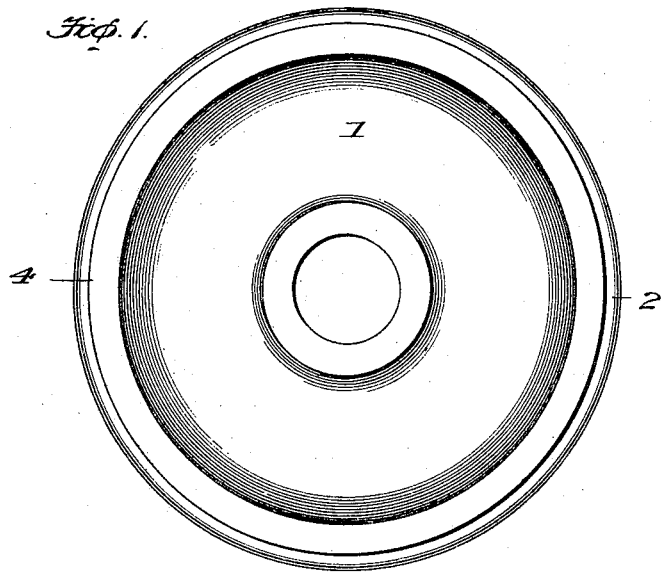
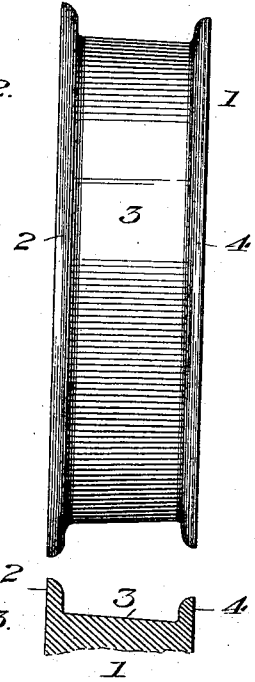
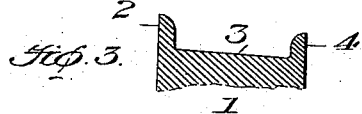

UNITED STATES PATENT OFFICE.

CHARLES N. CROUCH, OF TAYLORSVILLE, NORTH CAROLINA.

CAR-WHEEL.

981,536.  Specification of Letters Patent.  Patented Jan. 10, 1911.

Application filed July 20, 1910.  Serial No. 572,944.

*To all whom it may concern:*

Be it known that I, CHARLES N. CROUCH, a citizen of the United States, residing at Taylorsville, county of Alexander, and State of North Carolina, have invented certain new and useful Improvements in Car-Wheels, of which the following is a specification.

My invention relates to car wheels.

Many accidents arise from derailment due to the leaning over of the car while rounding curves, the leaning over to the lowest rail causing the wheel now in use to slip off the rail on the lowest side because it has a bevel slope.

My invention has for its object the provision of a car wheel whose flanges and tread are of novel construction, designed to retain the car on the rails at all times, even though the rails spring or sag, and to this end I provide a car wheel having the usual inner flange but whose tread is one inch, more or less, wider than the tread of a standard car wheel, the wheel being provided with an outer flange preferably of somewhat less height than the usual inner flange but of sufficient height so that if the flange of a car tend to pass laterally from wheels of a car tend to pass laterally from the rails, the outer flanges will engage the rails and prevent derailment, while the added width of the tread will at all times prevent any binding of the two flanges on the rail.

In the accompanying drawings:—Figure 1 is an outer face view of a car wheel constructed in accordance with my invention; Fig. 2, an edge view thereof; and Fig. 3, a cross section of the tread part and flanges.

The car wheel 1 has the usual inner flange 2, but the tread 3 is wider than as now constructed in general practice, said tread being one inch, more or less, wider than usual. The tread merges into an outer integral flange 4 which is, preferably, of less height, and smaller diameter than the inner flange 2. The tread 3 is, preferably, four inches wide between the flanges 2 and 4.

The tread 3, owing to its greater width, permits the usual lateral play of the wheel on the rail without causing any binding of the flanges against the rail so that no friction, other than usually exists, is engendered. The wheel is therefore allowed to play as usual, but should either or both rails tend to spring outwardly on account of broken or loose spikes or to spring or sag downwardly due to defective ties, the flanges 4 of the other car wheel on the opposite side of the car will engage the rail at that side and prevent the wheels from riding on the rails or becoming derailed and they are thus retained on the rail under all circumstances of ordinary travel.

Having thus described my invention, what I claim as new and desire to secure by Letters Patent, is:—

1. A car wheel having the usual integral inner flange, a sloping or inclined tread of greater than the standard width, and an outer integral flange of smaller diameter than the inner flange.

2. A car wheel having the usual integral inner flange, a sloping or inclined tread of greater than the standard width, an outer integral flange of smaller diameter than the inner flange, and also of less height than said inner flange.

In testimony whereof, I hereunto affix my signature in presence of two witnesses.

CHARLES N. CROUCH.

Witnesses:
 A. L. WATTS,
 LUTHER WHITE.